United States Patent
Kaynak et al.

(10) Patent No.: US 12,332,743 B2
(45) Date of Patent: Jun. 17, 2025

(54) EFFICIENT MEMORY USE TO SUPPORT SOFT INFORMATION IN BIT FLIPPING DECODERS

(71) Applicant: Micron Technology, Inc., Boise, ID (US)

(72) Inventors: Mustafa N. Kaynak, San Diego, CA (US); Eyal En Gad, Highland, CA (US); Zhengang Chen, San Jose, CA (US); Sivagnanam Parthasarathy, Carlsbad, CA (US); Phong Sy Nguyen, Livermore, CA (US); Dung V. Nguyen, San Jose, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 37 days.

(21) Appl. No.: 18/507,805

(22) Filed: Nov. 13, 2023

(65) Prior Publication Data

US 2024/0168847 A1 May 23, 2024

Related U.S. Application Data (60) Provisional application No. 63/384,583, filed on Nov. 21, 2022.

(51) Int. Cl.
*G06F 11/10* (2006.01)
*G06F 11/07* (2006.01)

(52) U.S. Cl.
CPC ........ *G06F 11/1068* (2013.01); *G06F 11/076* (2013.01); *G06F 11/1016* (2013.01)

(58) Field of Classification Search
CPC . G06F 11/1068; G06F 11/076; G06F 11/1016
See application file for complete search history.

(56) References Cited

U.S. PATENT DOCUMENTS

| | | | |
|---|---|---|---|
| RE46,346 E * | 3/2017 | Sommer | ............. G06F 11/1068 |
| 11,146,290 B1 | 10/2021 | Xiong et al. | |
| 2013/0028335 A1 * | 1/2013 | Limberg | ................ H04L 1/005 |
| | | | 375/240.27 |

(Continued)

OTHER PUBLICATIONS

International Search Report and Written Opinion, PCT App. No. PCT/US2023/080492, Mar. 11, 2024, 08 pages.

*Primary Examiner* — Guy J Lamarre
(74) *Attorney, Agent, or Firm* — NICHOLSON DE VOS WEBSTER & ELLIOTT LLP (57) ABSTRACT

A method includes performing a read operation of a first codeword including first hard data and generating an error vector using a reliability metric of the first hard data. The first hard data and error vector are stored in first and second portions of memory. A first corrected codeword is returned that combines the error vector and the hard data from the first and second portions of memory. A read operation of a second codeword is performed, including second hard data and soft information. The hard data and soft information are stored in the first and second portions of memory. A bit of second hard data is flipped responsive to comparing a reliability metric of the bit of the second hard data to a bit flipping threshold, wherein flipping the bit includes updating the second hard data. The updated second codeword is returned resulting from reading the portions of memory.

20 Claims, 6 Drawing Sheets

(56) References Cited

U.S. PATENT DOCUMENTS

| | | | |
|---|---|---|---|
| 2014/0153338 A1* | 6/2014 | Byeon | G11C 16/3404 |
| | | | 365/207 |
| 2015/0188570 A1 | 7/2015 | Kwok et al. | |
| 2017/0279468 A1* | 9/2017 | Kumar | H03M 13/2942 |
| 2018/0262215 A1* | 9/2018 | Sharon | G06F 11/1012 |
| 2020/0401475 A1 | 12/2020 | Lu | |
| 2021/0263794 A1 | 8/2021 | Shin et al. | |
| 2022/0321148 A1 | 10/2022 | Kaynak et al. | |

* cited by examiner

EFFICIENT MEMORY USE TO SUPPORT SOFT INFORMATION IN BIT FLIPPING DECODERS

CROSS-REFERENCE TO RELATED APPLICATION

The present application claims the benefit of U.S. Provisional Patent Application No. 63/384,583 filed on Nov. 21, 2022, which is incorporated by reference herein in its entirety.

TECHNICAL FIELD

The present disclosure generally relates to error correction, and more specifically, relates to methods and system for efficient use of memory to support soft information in bit flipping decoders.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to methods and systems of supporting soft information in decoders of a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MHLCs), triple-level cells (TLCs), and quad-level cells (QLCs). For example, an SLC can store one bit of information and has two logic states.

A memory subsystem uses word lines and bit lines to access memory cells of the memory subsystem. By applying a charge to the word line, the transistor gate opens, allowing any stored charge of the transistor to flow to a decoder to decode the charge, mapping the charge to a bit value. A memory cell can represent different bit values through the application of different threshold voltage values to the transistor gate. For example, an SLC can store one of two possible bit values ("0" and "1") and each of two different threshold voltages can be applied to the gate of the transistor in a read operation. The threshold voltage that results in source/drain conduction indicates the current state of the bit value. Similarly, MLC, TLC, and QLC memory represent more than two possible bit values and have a corresponding additional number of different threshold voltage values used in a read operation to determine the current bit values.

Low-Density Parity Check (LDPC) codes are commonly used for enabling error correction in memory subsystems. LDPC codes are a class of highly efficient linear block codes that include single parity check (SPC) codes. LDPC codes have a high error correction capability and can provide performance close to Shannon channel capacity. LDPC decoders utilize a "belief propagation" algorithm, which is based on the iterative exchange of reliability information, e.g., "beliefs." The MinSum algorithm (MSA), which is a simplified version of belief propagation algorithm, can be used for decoding LDPC codes. However, MSA-based decoders use a relatively high amount of energy per bit (pico-Joule per bit) for decoding codewords and hence are not well suited for energy conscious applications (such as mobile applications). Bit Flipping (BF) decoders have been introduced to address this problem.

A BF decoder is an iterative decoder. Each iteration of the decoding process, the BF decoder flips bits based on a comparison of an energy function per bit (or other reliability metric) to a bit flipping threshold. The bit flipping threshold (or a flipping criterion) can be selected to make the decoder more/less aggressive in terms of flipping more/less bits. The BF decoder can determine an energy function value for a bit in a non-defective bit location of the codeword based on the number of satisfied parities for the bit and/or channel information for that bit. For example, a higher number of satisfied parities for a bit is an indication of a more reliable bit and results in a higher energy function value for the bit. Additionally, a lower number of satisfied parities for the bit is an indication of a less reliable bit and results in a lower energy function value for the bit. When the current state of the bit matches the value of the bit that was read from the memory device, the current state of the bit can be considered to be more reliable. Therefore, an energy function value of a bit is greater when the current state of the bit matches the hard bit received from the memory device than when the current state of the bit does not agree with the hard bit. Each iteration, the BF decoder flips a bit when the energy function of the bit satisfies the bit flipping threshold.

The BF decoder utilizes multiple memories (or multiple portions of the same memory component) to determine a corrected BF decoder output. For example, a first memory (sometimes referred to as "hard bit memory") is used to store read data from a memory device (e.g., a non-volatile memory device such as a negative-and (NAND) device.) A second memory (sometimes referred to as "error vector memory") tracks error locations by identifying bit positions in the hard data that include a bit read in error, and a third memory (sometimes referred to as syndrome memory) stores the syndrome of a codeword after each iteration of a BF decoder. During the course of a conventional error correction scheme, the first memory remains static, while the second memory and third memory are dynamically updated.

As compared to MSA-based decoders, BF decoders use less energy per bit at the expense of providing relatively lower error correction. As described herein, soft information improves error correction capabilities. For example, using soft information, error correction processes are more likely to target error correction of weak bits as opposed to strong bits. However, the incorporation of soft information in error correcting code consumes additional hardware/system resources (e.g., resources required to transfer the soft information through a channel that is shared between multiple dice, resources required to buffer (or otherwise store) the soft information, etc.). For example, a codeword including 4 k bits may involve transferring a total of 8 k bits (e.g., 1 bit of soft information for each 1 bit of hard data). Moreover, obtaining soft information injects delays, as multiple read operations are performed to obtain the soft information.

Aspects of the present disclosure address the above and other deficiencies by triggering a more efficient use of memory of the BF decoder to include soft information. When additional accuracy is needed, an existing allocation of memory resources of the BF decoder is repurposed to accommodate soft information. For example, static memory of the BF decoder is repurposed to maintain soft information. In such embodiments, the BF decoder considers soft information when determining bits to flip without consuming additional hardware resources. As a result, the accuracy of the corrected codeword improves, reducing a number of iterations required to correct the codeword. In this manner, computing resources (e.g., in terms of power and storage) are conserved.

Figure 1:
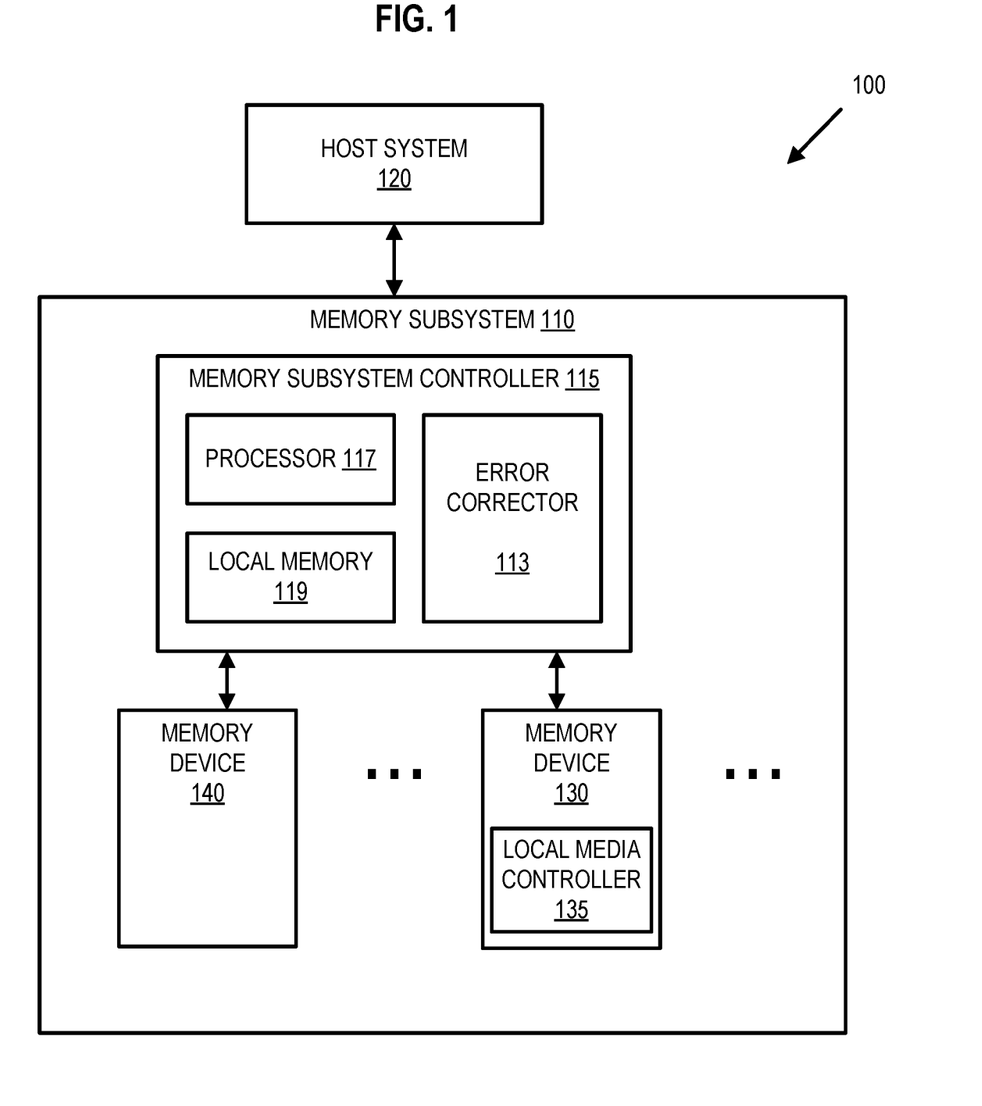
FIG. 1 illustrates an example computing system that includes a memory subsystem in accordance with some embodiments of the present disclosure.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes an error corrector 113 that efficiently uses memory to support the use of soft information in a bit flipping decoder. In some embodiments, the controller 115 includes at least a portion of the error corrector 113. For example, the controller 115 can include a processor 117 (processing device) configured to execute instructions stored in local memory 119 for performing the operations described herein. In some embodiments, an error corrector 113 is part of the host system 120, an application, or an operating system.

In some implementations, the error corrector 113 is operative to encode and decode data stored in the memory device (e.g., an encoder and/or decoder). Encoding data using an error correcting code (ECC) allows for correction of erroneous data bits when the data is retrieved from the memory device. For example, the error corrector 113 can encode data received from the host system 120 and store the data and parity bits as codewords in the memory device 130. The error corrector 113 can be further operative to decode data stored in the memory device 130 to identify and correct erroneous bits of the data before transmitting corrected data to the host system 120. Although illustrated as a single component that can perform encoding and decoding of data, the error corrector 113 can be provided as separate components. In some embodiments, the error corrector 113 is operative to encode data according to a Low-density parity-check (LDPC) code. The error corrector 113 is operative to decode the codewords stored in the memory device 130 based on a BF decoder. As described below, the error corrector 113 implements an enhanced BF decoder that efficiently uses memory to support the use of soft information during error correction.

The error corrector 113 receives hard data and, optionally, soft information from a memory device (e.g., memory device 130 or memory device 140). When the error corrector 113 receives soft information, it can dynamically use the same amount of memory in implementing a bit flipping decoder as when decoding a codeword without soft information. The error corrector 113 stores the soft information by repurposing memory, e.g., otherwise used to store hard data by the error corrector 113 when decoding a codeword without soft information. When decoding the codeword with soft information, hard data bits are flipped by the error corrector 113 based on a comparison between a reliability metric and a bit flipping threshold. The error corrector 113 selects the bit flipping threshold based on the soft information corresponding to the bit. The corrected hard data is output as a corrected codeword to a host system 120, memory device 130 or memory device 140. Further details with regard to the operations of the error corrector 113 are described below.

Figure 2A:
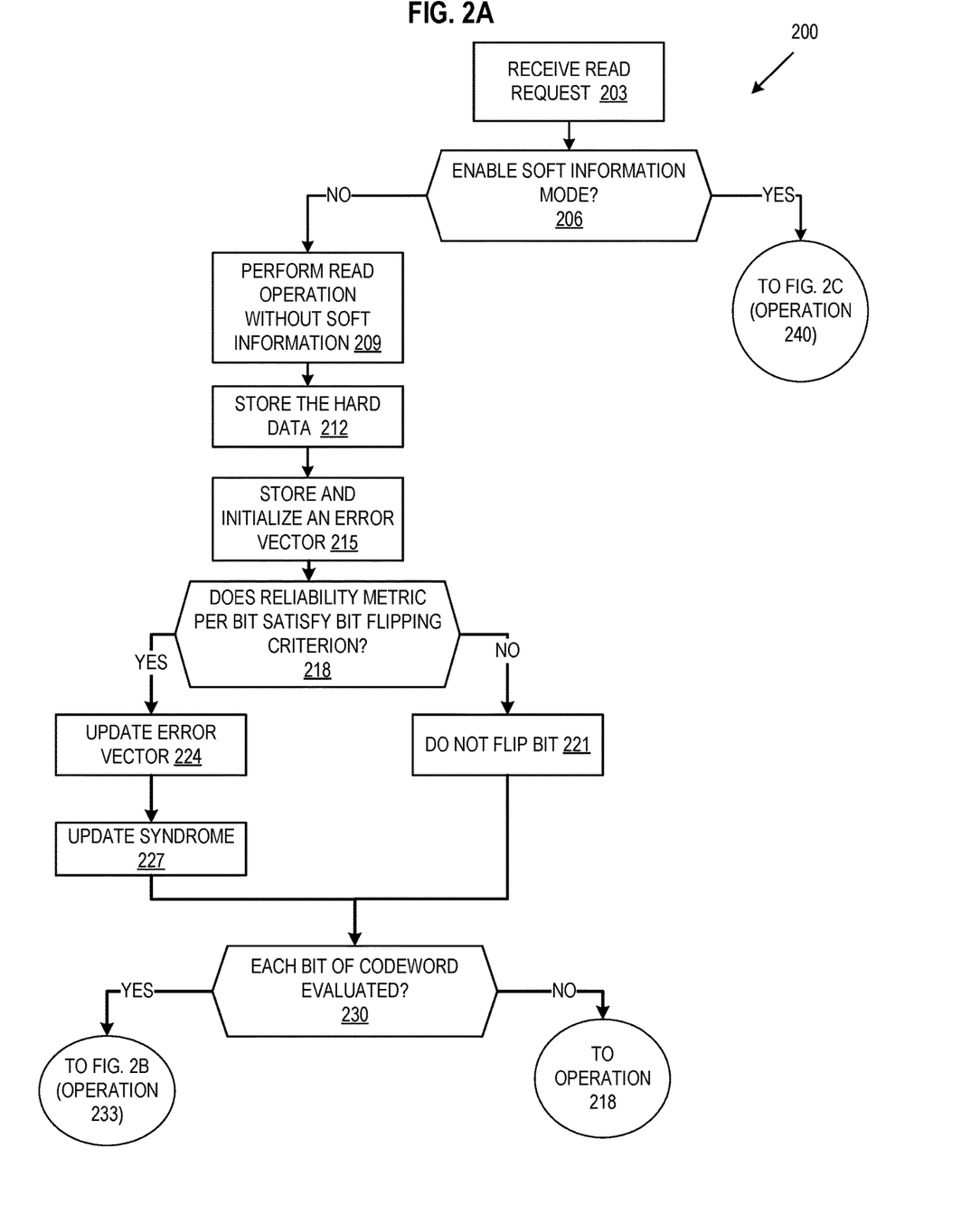
FIGS. 2A-2C are flow diagrams of an example method to support soft information in bit flipping decoders in accordance with some embodiments of the present disclosure.
Figure 2B:
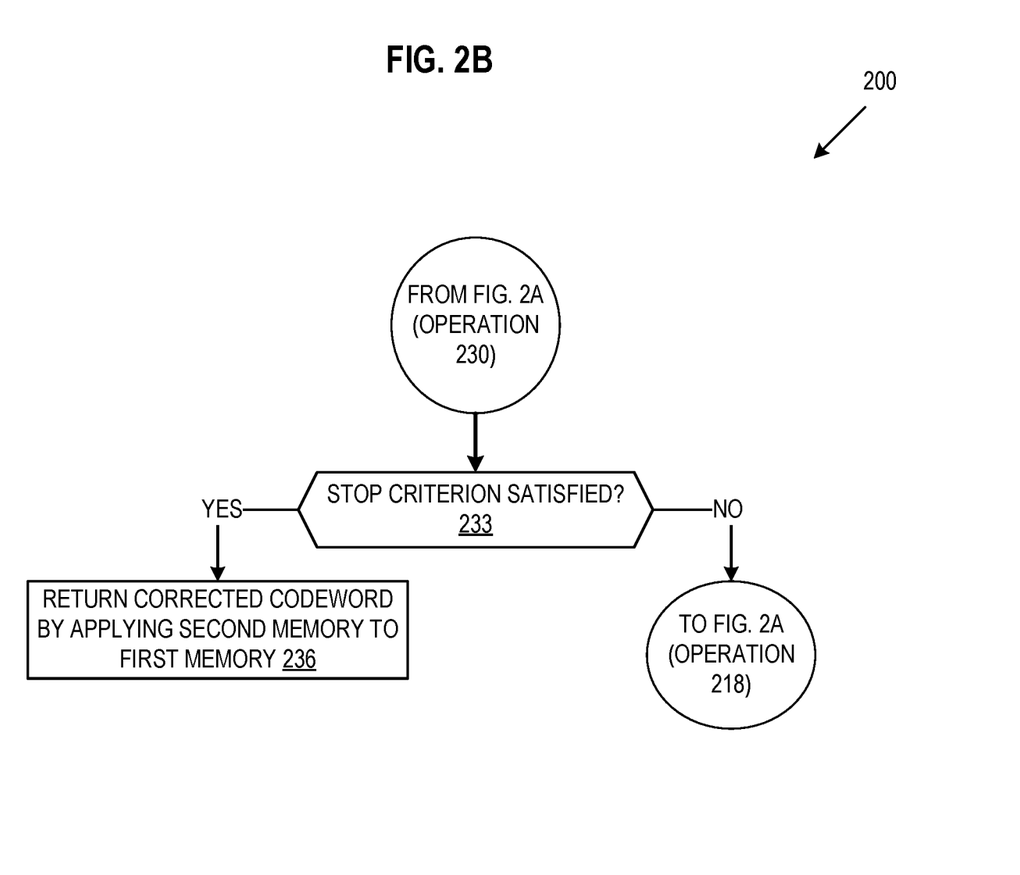
Figure 2C:
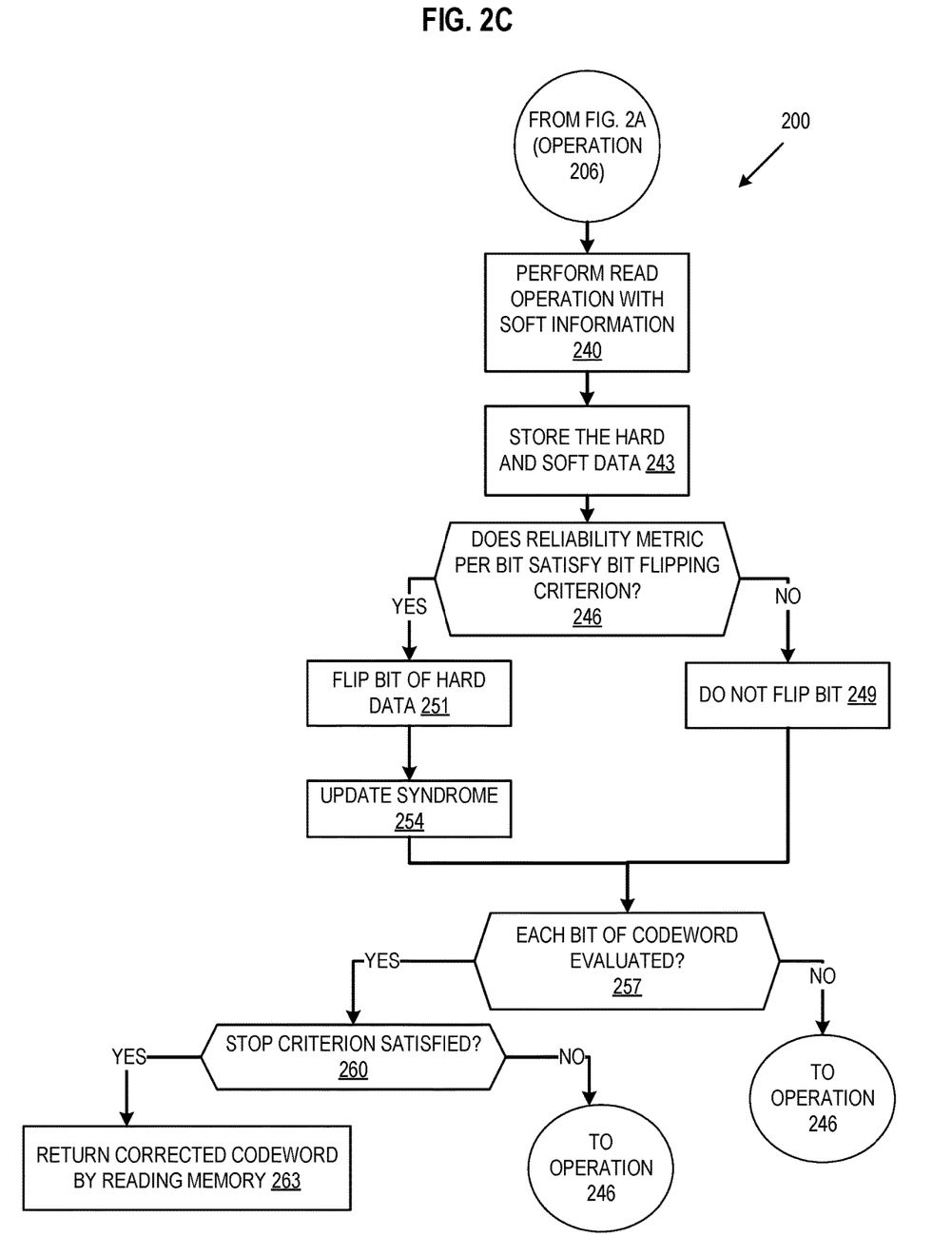

FIG. 2 is a flow diagram of an example method 200 of efficiently using memory to support using soft information in bit flipping decoders, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by a processing device such as the error corrector 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 203, the processing device receives a read request. For example, the host system 120 or an internal media management process of the memory subsystem 110 can issue a read command that identifies data to be read from a portion of the memory. The processing device (such as the error corrector 113) is directed to a location/address of memory that contains the data to be read.

At operation 206, the processing device determines whether to enable a soft information mode. For example, the error corrector 113 determines to enable the soft information mode responsive to determining that the read operation is directed to an address mapped to an indicator of a low-reliability portion of memory (e.g., a portion of memory with a high bit error rate). In a non-limiting example, the read operation may be directed to a weak wordline resulting from physical manufacturing issues. In some implementations, the error corrector 113 determines memory is low-reliability over time (e.g., during use of the memory subsystem).

To determine that the read operation is directed to the indicator of the low-reliability portion of memory (e.g., the address of the weak line), the error corrector 113 compares the address of a received read operation to a log, list, or other data structure of addresses associated with weak wordlines. If the error corrector 113 matches the address of the read operation to an address associated with a weak wordline in the log, the error corrector 113 determines to enable soft information mode.

Additionally or alternatively, the error corrector 113 determines to enable soft information mode responsive to determining that soft information mode will improve an error correction probability by a threshold amount. For example, an error rate above a threshold value can be an indication of a weak wordline. The ability to correct wordlines with error rates above the threshold is improved by considering soft information when determining what bits to flip.

In other embodiments, the error corrector 113 determines to enable soft information mode responsive to receiving an indication (or instruction) to enable soft information mode.

If the error corrector 113 enables soft information mode, the flow of operations moves to operation 240. If the error corrector 113 does not enable soft information mode, the flow of operations moves to operation 209.

At operation 209, the processing device performs a read operation without soft information. In general, a read operation involves applying a voltage to a word line powering a transistor (e.g., a memory cell of the memory subsystem). A hard read is a read operation to distinguish between the multiple states to which a memory cell may be programmed. A hard read returns hard data, e.g., a digit ("0" or "1") corresponding to the state determined by the read operation.

At operation 212, the processing device stores the hard data of the codeword. In an embodiment, the error corrector 113 stores the hard data in the first memory. The first memory is a size of memory up to the size of the codeword. In the above embodiment (e.g., a bit flipping decoder decoding the codeword without soft information), the data remains static in the first memory such that the hard data of the codeword is maintained as read from memory (i.e., including bits in error, if any).

At operation 215, the processing device initializes the error vector to all zero. In an embodiment, the error corrector 113 stores the initialized error vector in the second memory. As described herein, the size of the error vector is at least the size of the codeword.

At operation 218, the processing device compares an energy function value per bit (or some other reliability metric per bit, such as a number of parity violations) to a bit flipping criterion. For example, the error corrector 113 determines the energy function of a bit using the number of failed/satisfied parity checks for the bit (e.g., syndrome information) and/or channel information for the bit, indicating whether the bit is in the state in which it was read from memory or flipped from that original state. In some embodiments, the bit flipping criterion is a bit flipping/energy function threshold. For example, the error corrector 113 can determine to flip a bit when the energy function value of the bit is less than or equal to the bit flipping threshold and to not flip the bit when the energy function value of the bit is greater than the bit flipping threshold.

If the reliability metric does not satisfy a bit flipping criterion, then the flow of operations moves to operation 221. At operation 221, if the reliability metric (e.g., the energy function value of a bit of the codeword) does not satisfy the bit flipping criterion, then the error corrector 113 does not flip the bit (i.e., does not update the error vector to reflect a bit flip).

If the reliability metric does satisfy a bit flipping criterion, then the flow of operations moves to operation 224. At operation 224, the stored error vector is updated to reflect a bit flip in the codeword. For example, if the reliability metric (e.g., the energy function value of a bit of codeword) satisfies the bit flipping criterion, then the error corrector 113 flips a bit of the error vector indicating the position of the bit that satisfied the bit flipping criterion.

In this manner, the error corrector 113 updates the error vector location mapped to the bit location. For example, a value of "0" in the kth bit position in the error vector memory indicates that a bit in the kth bit position of the hard bit memory was not read in error (e.g., does not satisfy the bit flipping threshold, resulting in error corrector 113 not flipping the kth bit, or the error corrector 113 flipped the bit an even number of times, resulting in the bit remaining in the state as read). In contrast, a value of "1" in the kth+1 bit position in the error vector memory indicates that a bit in the kth+1 bit position of the hard bit memory was read in error (e.g., satisfies the bit flipping threshold, resulting in the error corrector 113 flipping the kth+1 bit). Updating the error vector allows the error corrector 113 to report the number of bits corrected by the BF decoder. As a result, the error corrector 113 can determine the error rate of the read data based on the number of bits corrected by the BF decoder and the number of bits of one or more codewords.

At operation 227, the processing device computes the updated syndrome information following the determination of which bits to flip in a given iteration of the bit flipping decoder and stores the updated syndrome in the syndrome memory. As described herein, the syndrome memory is a third memory used by the error corrector 113 to store the syndrome of a codeword. The syndrome indicates whether each parity bit of the codeword is satisfied, e.g., failed parity checks following the error corrector 113 flipping one or more bits in the current iteration of decoding. As such, syndromes provide information on the error state of a codeword or, more precisely, the state of each parity check equation. The syndrome weight indicates a number of erroneous parity checks in a codeword. In this manner, the BF decoder can determine if it is in fact correcting errors (e.g., when the syndrome weight decreases with one or more iterations) and when an iteration corrects all errors (e.g., reaching a null syndrome). The syndrome memory is the size of a number of parity bits. In one embodiment, values of "1" in the syndromes indicate the presence of parity errors, and values of "0" indicate there are no errors. When parity errors remain, the error corrector 113 can use the updated syndrome information in a subsequent iteration of the bit flipping decoding process.

At operation 230, the processing device determines whether each bit of the codeword is evaluated. The error corrector 113 may determine whether each bit of the codeword is evaluated using any suitable technique. For example, the error corrector 113 may compare a value of the length of the codeword to a counter. The error corrector 113 increments the counter each time the error corrector 113 performs operation 218. If the counter is equal to the value of the length of the codeword, then the error corrector 113 determines that each bit of the codeword has been evaluated. Subsequently, the error corrector 113 resets the counter. If the counter is less than the value of the length of the codeword, then the error corrector 113 determines that the codeword includes additional bits to be evaluated. If each bit of the codeword has been evaluated by the error corrector 113, then the flow moves to operation 233 (shown in FIG. 2B). If there are still bits to be evaluated by the error corrector 113, then the flow repeats at operation 218. As described herein, "generating" or "updating" the error vector includes evaluating each bit of a codeword. That is, generating/updating the error vector includes operations 218-230.

In a non-limiting example, when soft mode is disabled, the error corrector 113 stores hard data read from the memory cell in a first memory. The error corrector 113 stores the error vector, which is initially zero and updated to indicate erroneous bits, in a second memory. The error corrector 113 also stores and updates syndromes (e.g., in a third memory) as bits are flipped in the error vector. In a first iteration, the error corrector 113 computes the syndromes. At a second iteration, the error corrector 113 computes the energy per bit (e.g., based on the syndrome information determined in the first iteration and channel information). The error corrector 113 determines whether to flip the bit or not based on comparing the energy function to a bit flipping criterion. When the error corrector 113 determines that all syndromes are zero (e.g., zero syndrome weight following the flipping of zero or more bits in a given iteration), the error corrector 113 determines that it has corrected all of the errors in the codeword.

Referring to FIG. 2B, at operation 233, the processing device evaluates whether a stopping criterion is satisfied. A stopping criterion can include an indication that no errors are detected for the codeword. In some embodiments, the stopping criterion can include a null syndrome (i.e., zero syndrome weight) indicating that the codeword no longer includes erroneous bits. In some embodiments, the stopping criterion can include a maximum number of iterations or a maximum amount of time. For example, the error corrector 113 is operative to perform the maximum number of iterations (e.g., 30 iterations, 40 iterations, 100 iterations, etc.), and when this number of iterations is performed, the error corrector 113 outputs the resulting corrected codeword, regardless of whether the corrected codeword still includes erroneous bits or not, or an indication of decoding failure. When the stopping criterion is satisfied, the flow of operations moves to operation 236. Alternatively, when the stopping criterion is not satisfied, the flow of operations repeats at operation 218, at which the error correction of the codeword continues to the next iteration of the bit flipping decoding process. The error corrector 113 dynamically updates the error vector as each iteration the bit flipping decoder flips bits to correct errors in the codeword. For example, each iteration of error vector values represents the bits flipped relative to the copy of the hard data stored in the first memory. The error corrector 113 can flip one or more bits back and forth between values as originally read from memory, so the error vector is refined over iterations until the codeword is successfully decoded.

At operation 236, the processing device outputs the corrected codeword (or an indication of failure if the processing device was unable to decode the codeword). The error corrector 113 determines the corrected codeword by combining the error vector y and the hard data stored. For example, the error corrector 113 may exclusive-or (XOR) the error vector and the hard data to determine the corrected codeword. In operation, the hard data remains static as a state of a memory cell read from a memory device and bit positions of the hard data that are likely erroneous are indicated via the error vector. The error corrector 113 transmits the corrected codeword to the host 120, e.g., when the decoding was performed in response to a host read request.

Referring to FIG. 2C, at operation 240, the processing device performs a read operation with soft information. As described herein, a read operation involves applying a voltage to a word line powering a transistor (e.g., a memory cell of the memory subsystem). A hard read is a read operation to distinguish between the multiple states to which a memory cell may be programmed. A hard read returns hard data, e.g., a digit ("0" or "1") corresponding to the state determined by the read operation.

The processing device obtains soft information by performing multiple read operations at the memory address. Soft data associated with a read operation can be data other than the hard data obtained from the read operation. For example, soft information can indicate a confidence level with regards to a hard data bit. In a non-limiting example, soft information can indicate that there is a high confidence level with regards to a hard data bit and the hard data bit can be referred to as a strong bit. Alternatively, soft information can indicate that there is a low confidence level in the hard data bit and the hard data bit is referred to as a weak bit.

In some embodiments, soft information can be indicative of a particular voltage to which the memory cell is charged (where the memory cell is the one from which the hard data bit is read). In these embodiments, a hard data bit is less reliable (i.e., a weak bit) when its associated soft information is indicative of the memory cell being charged to a particular voltage that is near a boundary between two states; and a hard data bit is more reliable (i.e., a strong bit) when its associated soft information indicates that the memory cell is charged to a particular voltage away from a boundary voltage range corresponding to a state ("0" or "1"). By providing an indication of reliability of the hard bit data (e.g., a confidence level), soft information can improve error correction processes. For example, using soft information, error correction processes are more likely to target error correction of weak bits as opposed to strong bits.

In some embodiments, the soft information can include at most a soft bit for each bit of the hard data bit of the codeword. For example, for each hard data bit, there may be a corresponding soft bit indicating the confidence of the read hard bit data. In a non-limiting example, the soft bit can be "0" when the associated hard data bit is weak and "1" when the associated hard data bit is strong. In some embodiments, the soft information can include more than one soft bit for each bit of the hard data bit of the codeword. For example, when the soft information includes two soft bits, this results in four confidence levels for a bit such as very weak, weak, strong, and very strong.

At operation 243, the processing device stores the hard data of the codeword. In one embodiment, the error corrector 113 stores the hard data in the second memory. As described below, when the soft information mode is enabled, the error corrector 113 updates the hard data in the second memory with each iteration of decoding. In these embodiments, when the soft information mode is enabled, the error corrector repurposes 113 the second memory to store hard information. In other words, the error corrector 113 omits storing the hard data in the first memory. In these embodiments, regardless of whether the soft information mode is enabled, the error corrector 113 dynamically updates the second memory. For example, when the soft information mode is disabled, the error corrector 113 updates the error vector in the second memory with each iteration of decoding.

In another embodiment, the processing device stores the hard data in the first memory. In this embodiment, regardless of whether the soft information mode is enabled, the error corrector 113 stores hard information in the first memory. In this embodiment, the error corrector 113 does not repurpose the first memory. When the soft information mode is enabled, the error corrector dynamically updates the first memory such that the hard data is dynamically updated with each iteration of decoding.

Also at operation 243, the processing device stores soft information. In one embodiment, the error corrector 113 stores the soft information in the first memory. In this embodiment, regardless of whether the soft information mode is enabled, the error corrector 113 stores static data in the first memory. In this embodiment, the error corrector 113 repurposes the first memory to store soft information. That is, the error corrector 113 does not store hard data in the first memory, as would be done if the error corrector 113 decodes a codeword without soft information, and stores the hard data in the second memory as described above.

In another embodiment, the error corrector 113 stores the soft information in the second memory. In this embodiment, the error corrector 113 repurposes the second memory to store soft information. That is, the error vector omits storing the error vector when using soft information. As a result, when the soft information mode is enabled, the error corrector 113 stores static data in the second memory and when the soft information mode is disabled, the error corrector 113 stores dynamic data in the second memory. For example, as described herein, when the soft information mode is disabled, the error corrector 113 updates the error vector in the second memory with each iteration of decoding.

In one example implementation, when the soft information mode is enabled, the error corrector 113 stores the hard data in the second memory and the soft information in the first memory. When the soft information mode is disabled, the error corrector stores the hard data in the first memory and the error vector in the second memory.

At operation 246, the processing device compares an energy function value per bit (or some other reliability metric per bit, such as a number of parity violations) to a bit flipping threshold out of multiple bit flipping thresholds. In some embodiments, the number of bit flipping thresholds corresponds to a number of confidence levels for a bit, based on a number of bits of the soft information. Each bit flipping threshold corresponds to a confidence of a bit, based on the soft information. In operation, the soft information of a bit classifies which bit flipping threshold to apply to that bit. The one or more bit flipping thresholds may be optimized a-priori based on heuristics or any one or more optimization algorithms (e.g., including machine learning algorithms).

In a first non-limiting example, if the soft information includes one soft bit, then there may be two confidence levels corresponding to "weak" or "strong" bits. In these cases, there may be two bit flipping thresholds corresponding to "weak" and "strong" bits. If a bit is determined to be a weak bit (according to the value of the soft information), then the error correctors 113 applies a corresponding weak bit flipping threshold to the energy function of that bit (or other reliability metric).

In a second non-limiting example, if the soft information includes two bits, then there may be four confidence levels corresponding to very weak, weak, strong, and very strong bits. In these cases, there may be four bit flipping thresholds corresponding to the very weak, weak, strong, and very strong bits. Responsive to the soft information of a bit, the error corrector 113 applies the corresponding bit flipping threshold to the energy function of that bit (or other reliability metric). It should be appreciated that the second non-limiting example, describing two bits of soft information, involves allocating additional memory to store the soft information.

In other embodiments, the reliability metric of a bit includes soft information. For example, the error corrector 113 factors the soft information into the determination of the energy function per bit. In a non-limiting example, the error corrector 113 adds or subtracts a value based on the soft information. As a result, the error corrector 113 compares the energy function value per bit, considering the soft information of the bit, to a bit flipping threshold. In this example, the bit flipping threshold may be a bit flipping threshold based on the soft information of the bit (as described above). Additionally or alternatively, the bit flipping threshold may be a universal bit flipping threshold (e.g., the bit flipping threshold used when soft information mode is disabled) because the error corrector 113 incorporates the soft information into the energy function.

If the reliability metric does not satisfy the bit flipping criterion, then the flow of operations moves to operation 249. At operation 249, the error corrector 113 does not flip a bit (i.e., does not flip a bit of the hard data read from memory, as described herein). If the reliability metric does satisfy a bit flipping criterion, then the flow of operations moves to operation 251.

At operation 251, the processing device flips a bit of hard data. Specifically, the hard data read from memory is updated.

Instead of indicating which bits are flipped (e.g., using an error vector, for instance), the error corrector 113 flips bits read directly from the memory cell.

In a non-limiting example, every codeword bit participates in five parities (e.g., each bit is checked against five parities). In the example, the error corrector 113 determines that two bits of the codeword both have three parity violations. That is, out of five parities, three are not satisfied. Without soft information, the error corrector 113 treats both bits equally. With soft information, the error corrector 113 can treat strong and weak bits differently despite an equal number of parity violations, e.g., by applying a different bit flipping threshold to the bits. In an example, a first bit of the two bits of the codeword that have three parity violations is a weak bit, and a second bit of the two bits of the codeword that have three parity violations is a strong bit. In the example, a bit flipping threshold correlated to a strong bit includes four or more parity violations. That is, a strong bit is flipped if the strong bit has four or more parity violations. In contrast, a bit flipping threshold correlated to a weak bit includes three or more parity violations. Accordingly, the error corrector 113 flips the first bit (e.g., the weak bit) because the bit flipping threshold correlated to the weak bit is satisfied (e.g., the weak bit has three parity violations and the weak bit threshold is three or more parity violations). In contrast, the error corrector 113 does not flip the second bit (e.g., the strong bit) because the bit flipping threshold correlated to the strong bit is not satisfied (e.g., the strong bit has three parity violations and the strong bit threshold is four or more parity violations). Accordingly, both bits are not treated equally because the weak bit corresponds to a lower bit flipping threshold and the strong bit corresponds to a higher bit flipping threshold.

At operation 254, the processing device computes the updated syndrome information following the determination of which bits to flip in a given iteration of the bit flipping decoder and stores the updated syndrome in the syndrome memory. As described herein, the syndrome memory is a third memory used by the error corrector 113 to store the syndrome of a codeword. The syndrome indicates whether each parity bit of the codeword is satisfied, e.g., failed parity checks following the error corrector 113 flipping one or more bits in the current iteration of decoding. As such, syndromes provide information on the error state of a codeword, or more precisely, the state of each parity check equation. As described herein, values of "1" in the syndromes indicate the presence of parity errors, and values of "0" indicate there are no errors. When parity errors remain, the error corrector 113 can use the updated syndrome information in a subsequent iteration of the bit flipping decoding process.

At operation 257, the processing device determines whether each bit of the codeword is evaluated. The error corrector 113 may determine whether each bit of the codeword is evaluated using any suitable technique. For example, the error corrector 113 may compare a value of the length of the codeword to a counter. The error corrector 113 increments the counter each time the error corrector 113 performs operation 246. If the counter is equal to the value of the length of the codeword, then the error corrector 113 determines that each bit of the codeword has been evaluated. Subsequently, the error corrector 113 resets the counter. If the counter is less than the value of the length of the codeword, then the error corrector 113 determines that the codeword includes additional bits to be evaluated. If each bit of the codeword has been evaluated by the error corrector 113, then the flow moves to operation 260. If there are still bits to be evaluated by the error corrector 113, then the flow repeats at operation 246.

At operation 260, the processing device evaluates whether a stopping criterion is satisfied. A stopping criterion can include an indication that no errors are detected for the codeword. In some embodiments, the stopping criterion can include a null syndrome (i.e., zero syndrome weight) indicating that the codeword no longer includes erroneous bits. In some embodiments, the stopping criterion can include a maximum number of iterations or a maximum amount of time. For example, the error corrector 113 is operative to perform the maximum number of iterations (e.g., 30 iterations, 40 iterations, 100 iterations, etc.), and when this number of iterations is performed, the error corrector 113 outputs the resulting corrected codeword, regardless of whether the corrected codeword still includes erroneous bits or not, or an indication of decoding failure. When the stopping criterion is satisfied, the flow of operations moves to operation 263. Alternatively, when the stopping criterion is not satisfied, the flow of operations repeats at operation 246, at which the error correction of the codeword continues to the next iteration of the bit flipping decoding processing. The error corrector 113 dynamically updates the hard data as each iteration the bit flipping decoder flips bits to correct errors in the codeword.

At operation 263, the processing device outputs the corrected codeword (or an indication of failure if the processing device was unable to decode the codeword). For example, the error corrector 113 reads the dynamically updated hard data stored in memory (e.g., the first or second memory). The error corrector 113 outputs the updated hard data as the corrected codeword. That is, instead of indicating which bits to flip (e.g., using an error vector, for instance), and applying the error vector to the hard data, the error corrector 113 flips bits read directly from the memory cell within the first or second memory during the iterations of the bit flipping decoder. In operation, the hard data is updated dynamically as a state of a memory cell read from a memory device and processed in iterations of the bit flipping decoder. As a result, the hard bits become the corrected data. The error corrector 113 transmits the corrected codeword to the host 120, e.g., when the decoding was performed in response to a host read request.

Figure 3:
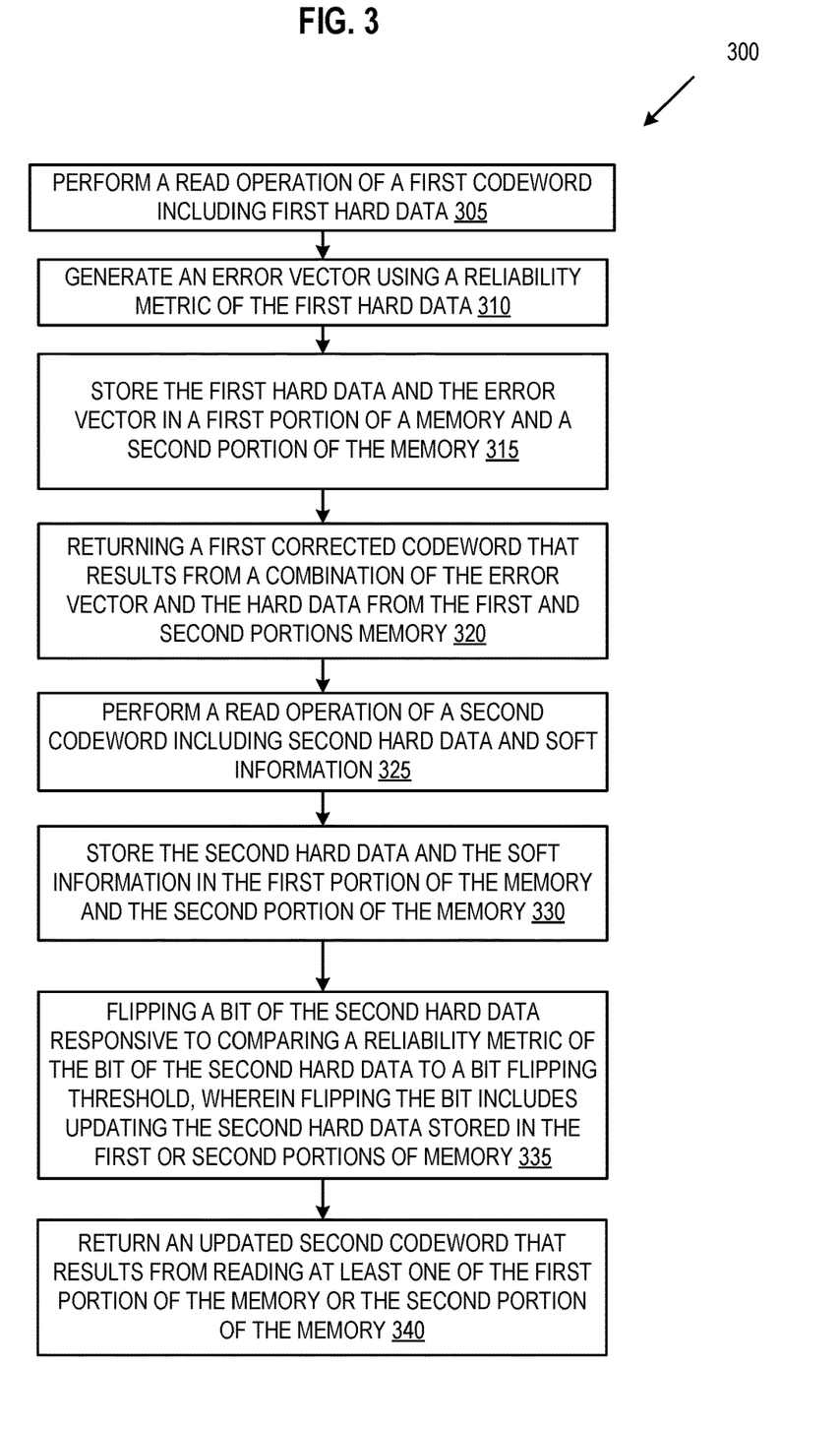
FIG. 3 is a flow diagram of an example method to efficiently use memory to support soft information in bit flipping decoders, in accordance with some embodiments of the present disclosure.

FIG. 3 is a flow diagram of another example method 300 of supporting soft information in bit flipping decoders, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by a processing device such as the error corrector 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing device performs a read operation of a first codeword including first hard data e.g., as described above with reference to operation 215. As described above, the read operation involves applying a voltage to a memory cell of a memory subsystem. A hard read returns hard data, e.g., a digit ("0" or "1") corresponding to the state determined by the read operation.

At operation 310, the processing device generates an error vector using a reliability metric of the first hard data. For example, as described above with reference to operations 218-230, the processing device compares an energy function per bit (or some other reliability metric per bit of the first hard data) to a bit flipping criterion. When the energy function value of a bit of the codeword does not satisfy the bit flipping criterion, the processing device does not flip the bit. When the energy function value of a bit of codeword satisfies the bit flipping criterion (with reference to operation 218 in FIG. 2A), the processing device flips the bit and updates the error vector (with reference to operation 225 in FIG. 2A) as well as the impacted syndromes, i.e., the parities the flipped bit participates (with reference to operation 227 in FIG. 2A). In some embodiments, the bit flipping criterion is a bit flipping threshold. The processing device determines to flip a bit when the energy function value of the bit satisfies the bit flipping threshold. For example, the processing device can determine to flip a bit when the energy function value of the bit is less than or equal to the bit flipping threshold and to not flip the bit when the processing device updates the error vector location mapped to the bit location.

At operation 315, the processing device stores the first hard data and the error vector in a first portion of a memory and a second portion of the memory, e.g., as described above with reference to operations 220 and 230. As described herein, the processing device utilizes multiple memories such as a first memory and a second memory. Additionally or alternatively, the processing device utilizes multiple portions of the same memory component. In either embodiment, first and second portions of memory can refer to separate, first and second memories as well as first and second portions of the same memory. In a first example, the processing device stores the hard data in the first memory. The first memory is a size of memory up to the size of the codeword. The data remains static in the first memory such that the hard data of the codeword is maintained as read from memory (i.e., including bits in error, if any). The processing device also stores the error vector in the second memory. The second memory of the processing device is a size of memory up to the size of the codeword. The processing device dynamically updates the error vector in the second memory as each iteration of the bit flipping decoder flips bits to correct errors in the codeword. In a second example the processing device stores the first hard data in the second memory. The processing device also stores the error vector in the first memory.

At operation 320, the processing device returns a first corrected codeword that results from a combination of the error vector and the hard data from the first and second portions of memory. For example, as described above with reference to operation 245, the processing device may exclusive-or (XOR) the error vector stored in the second memory of the processing device and the hard data stored in the first memory of the processing device to determine the corrected codeword.

At operation 325, the processing device performs a read operation of a second codeword including second hard data and soft information, e.g., as described above with reference to operation 250. As described above, the second hard information represents a state of a memory cell using values of zero and values of one. The processing device obtains soft information by performing multiple read operations. Soft information can indicate a confidence level with regards to a hard data bit. Using soft information, the processing device targets error correction of low confidence bits (e.g., weak bits) as opposed to high confidence bits (e.g., strong bits).

At operation 330, the processing device stores the second hard data and the soft information in the first portion of memory and the second portion of memory, e.g., as described above with reference to operation 255. When the processing device stores soft information, the processing device is configured to dynamically update the stored second hard data each iteration of decoding based on bit flips and statically maintain the stored soft information. Moreover, when the processing device stores soft information, the processing device omits storing the error vector. That is, memory that stored the error vector is repurposed.

In one implementation, the processing device stores the second hard data in a second memory. If the processing device stored the first hard data in the first memory, then the processing device does not store the second hard data in the first memory despite the processing device storing the first hard data in the first memory. If the processing device stored the error vector in the second memory, then the processing device repurposes the second memory to store the second hard data.

In another implementation, the processing device stores the second hard data in a first memory. If the processing device stored the first hard data in the first memory, then the processing device also stores the second hard data in the first memory. If the processing device stored the error vector in the first memory, then the processing device repurposes the first memory to store the second hard data.

In yet another implementation, the processing device stores the soft information in a first memory. If the processing device stored the first hard data in the first memory, then the processing device repurposes the first memory to store soft information. If the processing device stored the error vector in the first memory, then the processing device repurposes the first memory to store the soft information.

In another implementation, the processing device stores the soft information in a second memory. If the processing device stored the first hard data in the second memory, then the processing device repurposes the second memory to store the soft information. If the processing device stored the error vector in the second memory, then the processing device repurposes the second memory to store the soft information. At operation 335, the processing device flips a bit of the second hard data responsive to comparing a reliability metric of the bit of the second hard data to a bit flipping threshold, wherein flipping the bit includes updating the second hard data stored in the first or second portions of memory. For example, as described above with reference to operation 260, the processing device updates the second hard data to correct the second codeword, flipping one or more bits of the second hard data responsive to comparing a reliability metric (e.g., an energy function per bit, a number of parity violations, etc.) of the second hard data to a bit flipping threshold. For example, the processing device flips bits based on a comparison of an energy function per bit (or other reliability metric) to a bit flipping threshold out of multiple bit flipping thresholds. The number of bit flipping thresholds corresponds to a number of confidence levels for a bit, based on a number of bits of the soft information. Additionally or alternatively, the reliability metric of a bit includes soft information. For example, the processing device factors the soft information into the determination of the energy function per bit.

At operation 340, the processing device returns the updated second codeword that results from reading at least one of the first portion of memory or the second portion of memory. For example, as described above with reference to operation 275, the processing device reads the second hard data directly from either the first memory or the second memory (e.g., whichever memory is holding the second hard data).

In some implementations, the processing device incorporates the soft information into the reliability metric. For example, the processing device determines the energy function per bit by adding or subtracting a value based on the soft information corresponding to that bit. As a result, the energy function value per bit, considering the soft information of the bit, is compared to a bit flipping threshold.

In other implementations, the processing device incorporates the soft information into one or more bit flipping thresholds. The number of bit flipping thresholds corresponds a number of bits of the soft information. Each bit flipping threshold corresponds to a confidence of a bit, based on the soft information. The processing device flips a bit when the reliability metric of the bit satisfies the bit flipping threshold corresponding to the soft information of the bit.

Figure 4:
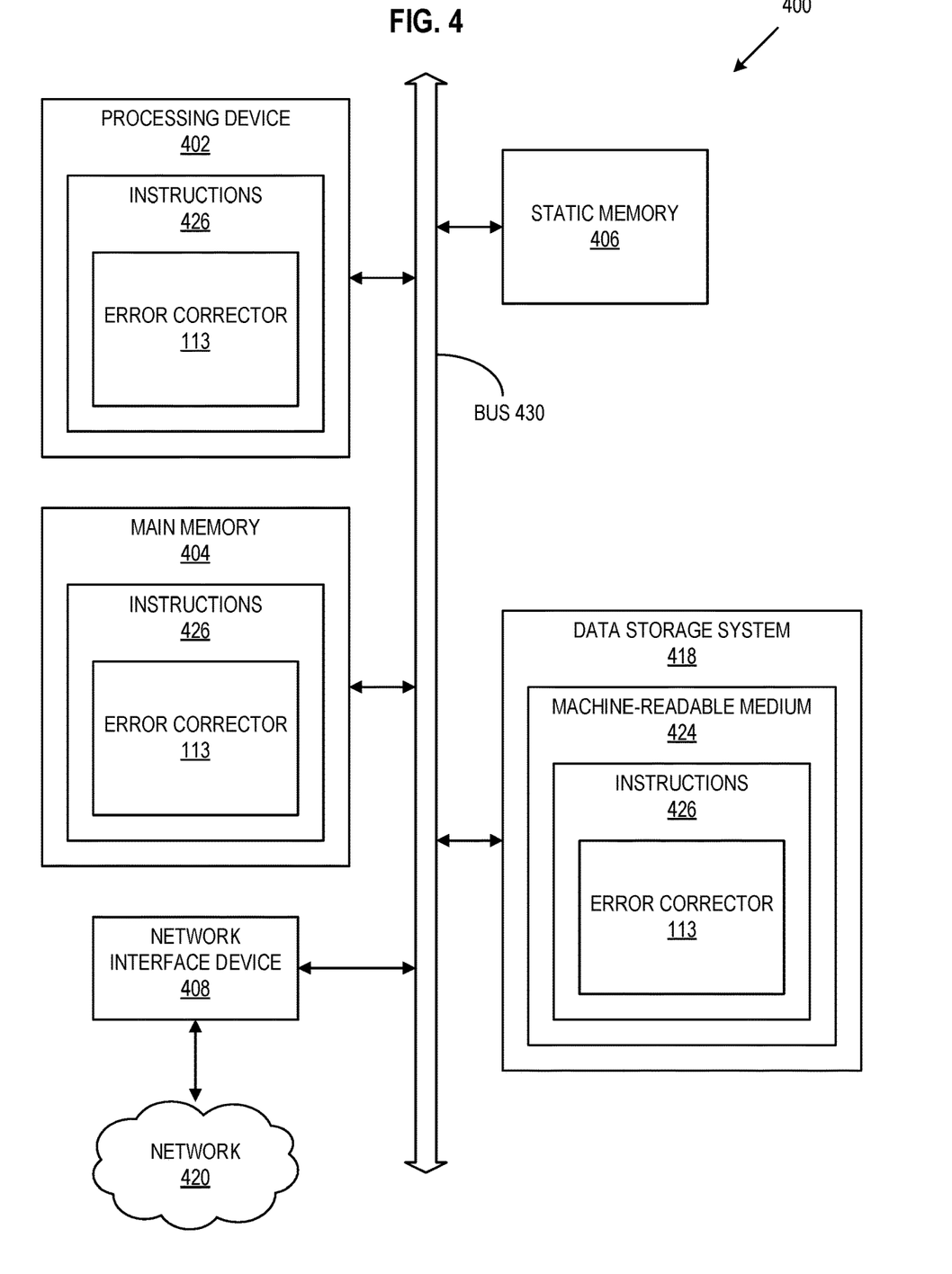
FIG. 4 is a block diagram of an example computer system in which embodiments of the present disclosure may operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the error corrector 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory subsystem 110 of FIG. 1.

In one embodiment, the instructions 426 include instructions to implement functionality corresponding to a error corrector (e.g., the error corrector component 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 200 and B00 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
performing a read operation of a first codeword including first hard data;
generating an error vector using a reliability metric of the first hard data;
storing the first hard data and the error vector in a first portion of a memory and a second portion of the memory;
returning a first corrected codeword that results from a combination of the error vector and the hard data from the first and second portions of memory;
performing a read operation of a second codeword including second hard data and soft information;
storing the second hard data and the soft information in the first portion of the memory and the second portion of the memory;
flipping a bit of the second hard data responsive to comparing a reliability metric of the bit of the second hard data to a bit flipping threshold, wherein flipping the bit includes updating the second hard data stored in the first or second portions of memory; and
returning an updated second codeword that results from reading at least one of the first portion of the memory or the second portion of the memory.

2. The method of claim 1, wherein:
the first hard data remains static as a first state of a memory cell read from a memory device, and
the second hard data is updated dynamically as a second state of the memory cell read from the memory device, wherein the second hard data is processed in iterations of a bit flipping decoder.

3. The method of claim 1, wherein:
the first hard data is stored in the first portion of the memory, and the error vector is stored in the second portion of the memory, and
the second hard data is stored in the second portion of the memory, and the soft information is stored in the first portion of the memory.

4. The method of claim 1, wherein the reliability metric of the bit of the second hard data includes soft information of the bit of the second hard data.

5. The method of claim 1, further comprising:
selecting the bit flipping threshold using the soft information of the bit of the second hard data.

6. The method of claim 1, further comprising:
receiving an indication to enable a soft information mode.

7. The method of claim 6, wherein the indication is responsive to determining a read operation directed to an address mapped to an indicator of a low-reliability portion of memory.

8. A non-transitory computer-readable storage medium comprising instructions that, when executed by a processing device, cause the processing device to:
perform a read operation of a first codeword including first hard data;
generate an error vector using a reliability metric of the first hard data;
store the first hard data and the error vector in a first portion of a memory and a second portion of the memory;
return a first corrected codeword that results from a combination of the error vector and the hard data from the first and second portions of memory;

perform a read operation of a second codeword including second hard data and soft information;

store the second hard data and the soft information in the first portion of the memory and the second portion of the memory;

flip a bit of the second hard data responsive to comparing a reliability metric of the bit of the second hard data to a bit flipping threshold, wherein flipping the bit includes updating the second hard data stored in the first or second portions of memory; and return an updated second codeword that results from reading at least one of the first portion of the memory or the second portion of the memory.

9. The non-transitory computer-readable storage medium of claim 8, wherein:

the first hard data remains static as a first state of a memory cell read from a memory device, and the second hard data is updated dynamically as a second state of the memory cell read from the memory device, wherein the second hard data is processed in iterations of a bit flipping decoder.

10. The non-transitory computer-readable storage medium of claim 8, wherein:

the first hard data is stored in the first portion of the memory, and the error vector is stored in the second portion of the memory, and the second hard data is stored in the second portion of the memory, and the soft information is stored in the first portion of the memory.

11. The non-transitory computer-readable storage medium of claim 8, wherein the reliability metric of the bit of the second hard data includes soft information of the bit of the second hard data.

12. The non-transitory computer-readable storage medium of claim 8, wherein the processing device is further to:

select the bit flipping threshold using the soft information of the bit of the second hard data.

13. The non-transitory computer-readable storage medium of claim 8, wherein the processing device is further to:

receive an indication to enable a soft information mode.

14. The non-transitory computer-readable storage medium of claim 13, wherein the indication is responsive to determining a read operation directed to an address mapped to an indicator of a low-reliability portion of memory.

15. A system comprising:

a memory device and a processing device, operatively coupled with the memory device, to:

perform a read operation of a first codeword including first hard data;

generate an error vector using a reliability metric of the first hard data;

store the first hard data and the error vector in a first portion of a memory and a second portion of the memory;

return a first corrected codeword that results from a combination of the error vector and the hard data from the first and second portions of memory;

perform a read operation of a second codeword including second hard data and soft information;

store the second hard data and the soft information in the first portion of the memory and the second portion of the memory;

flip a bit of the second hard data responsive to comparing a reliability metric of the bit of the second hard data to a bit flipping threshold, wherein flipping the bit includes updating the second hard data stored in the first or second portions of memory, wherein the reliability metric of the bit of the second hard data includes soft information of the bit of the second hard data; and return an updated second codeword that results from reading at least one of the first portion of the memory or the second portion of the memory.

16. The system of claim 15, wherein:

the first hard data remains static as a first state of a memory cell read from a memory device, and the second hard data is updated dynamically as a second state of the memory cell read from the memory device, wherein the second hard data is processed in iterations of a bit flipping decoder.

17. The system of claim 15, wherein:

the first hard data is stored in the first portion of the memory, and the error vector is stored in the second portion of the memory, and the second hard data is stored in the second portion of the memory, and the soft information is stored in the first portion of the memory.

18. The system of claim 15, wherein the processing device is further to:

select the bit flipping threshold using the soft information of the bit of the second hard data.

19. The system of claim 15, wherein the processing device is further to:

receive an indication to enable a soft information mode.

20. The system of claim 19, wherein the indication is responsive to determining a read operation directed to an address mapped to an indicator of a low-reliability portion of memory.

* * * * *